United States Patent [19]
Berndt

[11] 3,857,304
[45] Dec. 31, 1974

[54] GAS PEDAL ARRANGEMENT

[75] Inventor: Wilhelm Berndt, Meine, Germany

[73] Assignee: Volkswagenwerk AG, Wolfsburg, Germany

[22] Filed: Aug. 15, 1973

[21] Appl. No.: 388,431

Related U.S. Application Data
[63] Continuation of Ser. No. 315,576, Dec. 15, 1972, abandoned.

[30] Foreign Application Priority Data
Dec. 18, 1971 Germany............................ 2162940

[52] U.S. Cl..................................... 74/877, 74/513
[51] Int. Cl............................................ B60k, G05g
[58] Field of Search............ 74/512, 513, 560, 561, 74/877

[56] References Cited
UNITED STATES PATENTS
| | | | |
|---|---|---|---|
| 2,378,385 | 6/1945 | Banker | 74/877 |
| 3,224,292 | 12/1965 | Hubner | 74/513 |

FOREIGN PATENTS OR APPLICATIONS
| | | | |
|---|---|---|---|
| 1,249,363 | 11/1960 | France | 74/513 |

Primary Examiner—Samuel Scott
Assistant Examiner—Frank H. McKenzie, Jr.
Attorney, Agent, or Firm—Brumbaugh, Graves, Donohue & Raymond

[57] ABSTRACT

An improvement in a gas pedal arrangement for an internal combustion engine, including a gas pedal and an associated switch actuated by the gas pedal when the gas pedal is moved beyond a full throttle position, comprises a linkage device responsive to the gas pedal for transmitting movement of the gas pedal to an engine carburator and a stop for preventing the linkage device from responding to the gas pedal when the gas pedal moves beyond the full throttle position. When the stop prevents further response by the linkage device to the gas pedal, the linkage device effects relative movement of a rocker member pivotally mounted at one end on the gas pedal and biased away from the gas pedal by a spring. Movement of the rocker member toward the gas pedal actuates the switch.

7 Claims, 3 Drawing Figures

GAS PEDAL ARRANGEMENT

This is a continuation, of application Ser. No. 315,576 filed Dec. 15, 1972 now abandoned.

BACKGROUND OF THE INVENTION

It is increasingly popular to provide an internal combustion engine for an automobile with an automatic gear, such as a passing gear, into which the engine is shifted when its gas pedal is moved beyond the full throttle position. A common arrangement for activating such a passing gear, as shown in German Pat. No. 1,134,598, is to provide a switch that is actuated by the gas pedal and is mounted on the floor of the automobile passenger compartment underneath the gas pedal.

One shortcoming of the above-noted, patented gas pedal arrangement is that when the gas pedal is moved beyond the full throttle position to actuate the switch, the gas pedal simultaneously turns the throttle valve of the engine carburator beyond the proper full throttle position for the throttle valve. Although switches have been developed which require only a very small movement to be actuated and thus would seemingly require only a small additional movement of the gas pedal beyond its full throttle position, the tolerances of the various parts cooperating with the gas pedal require that the gas pedal be moved through a relatively large distance. As a result, the movement of the gas pedal which is transmitted to the engine carburator displaces the carburator throttle valve to a significant extent beyond the proper full throttle position for the throttle valve and significantly affects the operation of the engine.

To overcome the problems presented by displacement of the carburator throttle valve beyond its full throttle position, gas pedal-actuated switches have been placed in the immediate vicinity of the carburator and have been actuated by the gas pedal through appropriate linkages. In addition, carburator throttle valves have been provided with freewheeling or slipping devices that permit the throttle valve to remain in its full throttle position even if the gas pedal is depressed sufficiently to actuate the passing gear switch. Such arrangements are dependent upon the particular type of carburator being utilized with the engine, however, and because of their complexity are relatively difficult to assemble.

SUMMARY OF THE INVENTION

The present invention is an improvement in a gas pedal arrangement for an internal combustion engine which includes a switch for an automatic gear actuated by the gas pedal when the gas pedal is depressed beyond its full throttle position. The improvement comprises a linkage device responsive to the gas pedal for transmitting movement of the gas pedal to an engine carburator and a stop for preventing the linkage device from transmitting to the engine carburator movement of the gas pedal beyond its full throttle position. A rocker member is pivotally mounted at one end on the gas pedal and is biased away from the gas pedal by a spring. The rocker member responds to the linkage device when the gas pedal is moved beyond the full throttle position so that the linkage device effects relative movement of the rocker member towards the gas pedal against the biasing of the spring. The movement of the rocker member towards the gas pedal actuates the switch.

In one embodiment of the invention, the rocker member mounts the switch on the gas pedal and two supports are provided against which the rocker member is biased by the spring. One support is located adjacent the pivoted end of the rocker member and the other support is located in a zone where the linkage device is coupled to the gas pedal. The support adjacent the pivoted end of the rocker member includes an opening which is formed in an edge portion of the gas pedal and which receives the pivoted end of the rocker member. The other support includes an axle that traverses the rocker member, each end of the axle being received in an oblong opening formed in one of a pair of spaced apart flanges associated with the gas pedal. Both the pivoted end of the rocker member and the axle are held against the lower edges of their respective openings by the biasing action of the spring.

The linkage device includes an arm, of which the gas pedal axle forms one end, eccentrically mounted at its other end on a pivoting lever. Normally, downward movement of the gas pedal produces a corresponding movement of the arm and pivoting lever, but the stop for the gas pedal arrangement is located to prevent further pivoting movement of the lever when the gas pedal is moved beyond the full throttle position. The arm of the linkage device thus ceases to move downward and instead effects relative movement of the axle carried on the upper end of the arm upward through the oblong openings in its mounting flanges toward the gas pedal. The upward movement of the axle moves the rocker member toward the underside of the gas pedal, depressing the switch actuating pin against the gas pedal and actuating the switch.

In a second embodiment of the invention, the rocker member again mounts the switch on the gas pedal and two supports are provided for the rocker member. The support adjacent the pivoted end of the rocker member includes an axle that traverses the rocker member and couples the rocker member to the gas pedal. The other support includes an opening formed in an edge portion of the gas pedal through which the rocker member projects. The linkage device is coupled to the end portion of the rocker member projecting from the opening.

In operation, the spring biases the rocker member against the lower edge of the opening in the edge portion of the gas pedal and the linkage device moves downwardly with the gas pedal, until the stop for the gas pedal arrangement prevents further downward movement of the linkage device in response to movement of the gas pedal. The linkage device then causes the rocker member to move relatively toward the underside of the gas pedal, so that the actuating pin of the switch is depressed against the gas pedal and the switch is actuated.

As can be seen from the above description, the present gas pedal arrangement overcomes the difficulties of prior art arrangements regarding the relatively large actuating distances required for an automatic gear switch, without locating the switch in the immediate vicinity of the carburator or providing a freewheeling device for the carburator throttle valve. The inventive gas pedal arrangement is not dependent on the particular type of carburator utilized and is relatively easy to assemble.

Since the invention requires only a relatively few parts having easily controlled tolerances, it is possible to use switches with relatively small actuating displacements.

Moreover, the gas pedal for the invention may be used with an automobile engine that does not have an automatic gear and yet a switch can be installed easily at a later date if an automatic gear is desired.

BRIEF DESCRIPTION OF THE DRAWINGS

For a better understanding of the invention, reference may be made to the following description of two exemplary embodiments, taken in conjunction with the figures of the accompanying drawings, in which.

DESCRIPTION OF THE PREFERRED EMBODIMENTS

Figure 1:
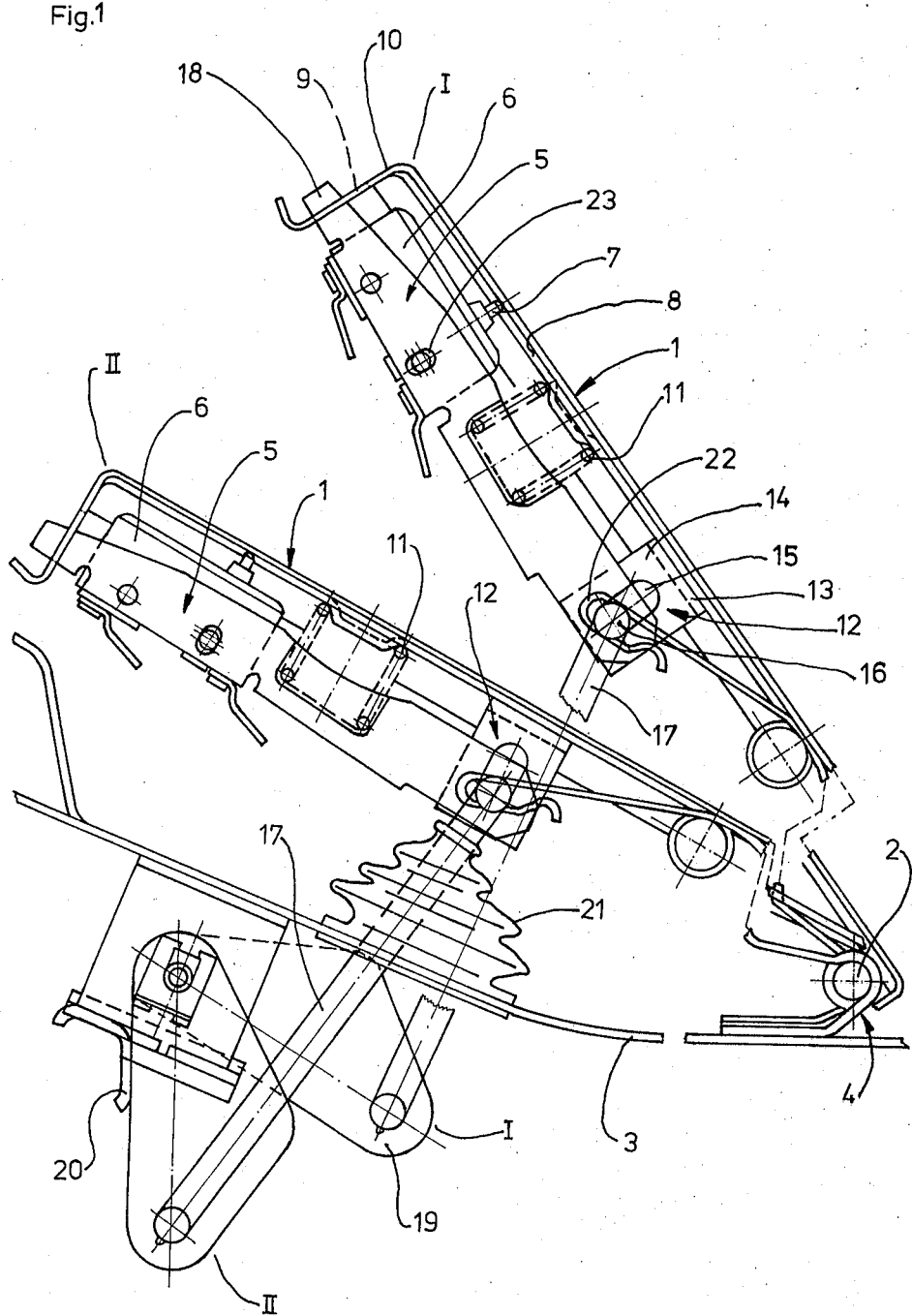
FIG. 1 is a side view of a gas pedal arrangement according to the invention, showing the gas pedal in both idling and full throttle positions.
Figure 2:
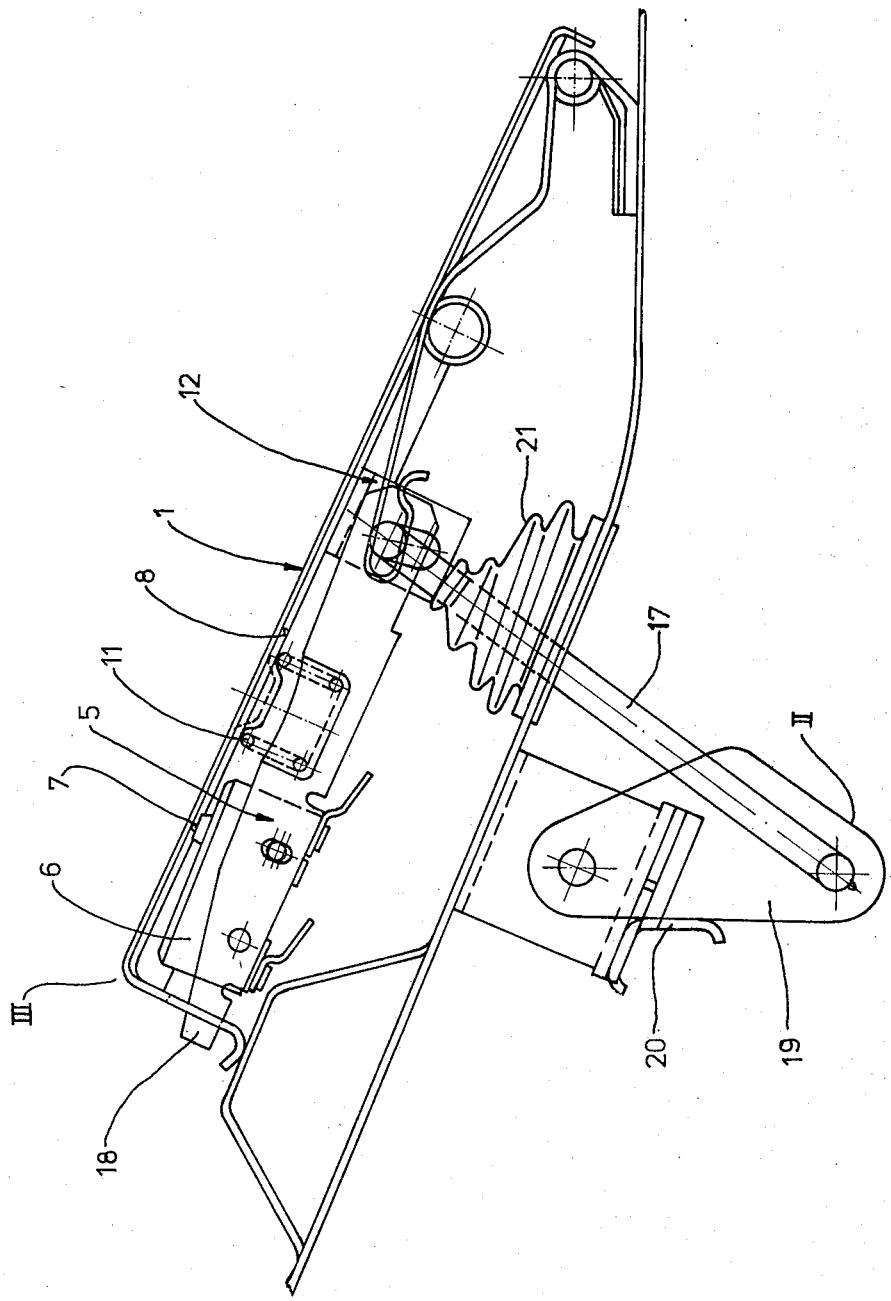
FIG. 2 is a side view of the embodiment of FIG. 1, showing the gas pedal in a position beyond its full throttle position.

In FIGS. 1 and 2 a gas pedal arrangement according to the invention is shown with the gas pedal 1 in an idling position, designated by the Roman numeral (I) in FIG. 1, in a full throttle position, designated (II) in FIG. 1, and in a position, designated (III) in FIG. 2, beyond its full throttle position. The gas pedal 1 is pivotally mounted at one end by a conventional hinge device 2 on the floor 3 of an automobile passenger compartment. A spring 4 located adjacent the hinge device 2 biases the gas pedal 1 to maintain the gas pedal normally in the idling position (I).

A rocker member 5 is mounted on the underside 8 of the gas pedal 1 and carries a switch 6 for actuating an automatic or passing gear for the automobile engine. The actuating pin 7 for the switch 6 is directed toward the underside 8 of the gas pedal 1 and is maintained in a fully extended position by a switch spring (not shown) contained within the switch 6. When the gas pedal 1 is in its idling (I) or full throttle (II) position or in any position between the two, the distance between the switch 6 on the rocker 5 and the underside 8 of the gas pedal 1 is sufficiently great that the actuating pin 7 is not depressed by the gas pedal 1 and the switch 6 is not actuated. The distance between the switch 6 and the underside 8 of the gas pedal 1 may be adjusted by moving a mounting pin attached to the switch 6 upwardly or downwardly in an oblong mounting slot 23 formed in the side of the rocker 5.

One end 18 of the rocker 5 is received in an opening 9 formed in an edge portion 10 of the gas pedal 1. The opening 9 is somewhat larger than the thickness of the rocker end 18 and the rocker end 18 is tapered to permit relative pivotal movement of the rocker end 18 in the opening 9, as described hereinafter. A compression spring 11 located adjacent the mid-point of the rocker 5 presses the rocker end 18 against the bottom edge of the opening 9 so that the edge constitutes a support for the rocker 5.

At the other end of the rocker 5, the center portion 13 of a U-shaped bracket 12 is attached to the underside 8 of the gas pedal 1, for example, by welding. The two flanges 14 of the bracket 12 have oblong holes 15 which receive the ends of an axle 16. The axle 16 extends transversely to the longitudinal axis of the rocker 5 and passes through a hole in the end of the rocker 5 which does not have an oblong shape so that there is no relative movement between the axle 16 and the end of the rocker 5. The axle 16 is also secured to the upper end of a rod 17 which comprises a part of a conventional linkage device for transmitting movement of the gas pedal 1 to the throttle valve of an engine carburetor (not shown). As shown, the axle 16 is a part of the rod 17 which has been bent at right angles to the longitudinal axis of the rod 17.

The rod 17 passes through an opening in the floor 3 which is sealed off by a flexible sleeve 21, formed of rubber, for example. The lower end of the rod m is eccentrically mounted on a lever 19 pivotally mounted adjacent the underside of the floor 3. When the gas pedal 1 is depressed, the rod 17 moves downwardly, causing the lever 19 to pivot about one end. When the gas pedal 1 reaches its full throttle position (II), a side of the lever 19 contacts a stop 20, also mounted adjacent the underside of the floor 3, which prevents further pivotal movement of the lever 19 and thus further transmission of the movements of the gas pedal 1 to the carburetor throttle valve. While the gas pedal 1 is being moved through any position between its idling (I) and its full throttle (II) positions, the axle 16 at the upper end of the bar 17 is held against the lower edge of the oblong opening 15 by the compression spring 11 which presses against the rocker 5. An extension 22 of the spring 4 may also be looped around the axle 16 to hold the axle 16 against the lower edge of the opening 15 so that the gas pedal 1 will operate properly even if it is not equipped with a rocker 5 and a compression spring 11.

FIG. 2 shows the gas pedal 1 depressed beyond its full throttle position (II) and in a position (III) for actuating the switch 6 and the passing gear for the automobile engine. The stop 20 prevented further pivotal movement of the lever 19 so that the carburetor throttle valve is maintained in its full throttle position. The rod 17 and the axle 16 mounted on its upper end thus ceased to move downwardly in response to the movement of the gas pedal 1 and, as the gas pedal was depressed, instead moved relatively toward the gas pedal 1 against the biasing action of the compression spring 11 and the extension 22 of spring 4. The axle 16 moved upwardly through the oblong holes 15 in the bracket 12 carrying the end of the rocker 5 with it. The rocker 5 pivoted about one end 18 and the actuating pin 7 of the switch 6 was depressed against the underside 8 of the gas pedal 1, actuating the switch 6.

Figure 3:
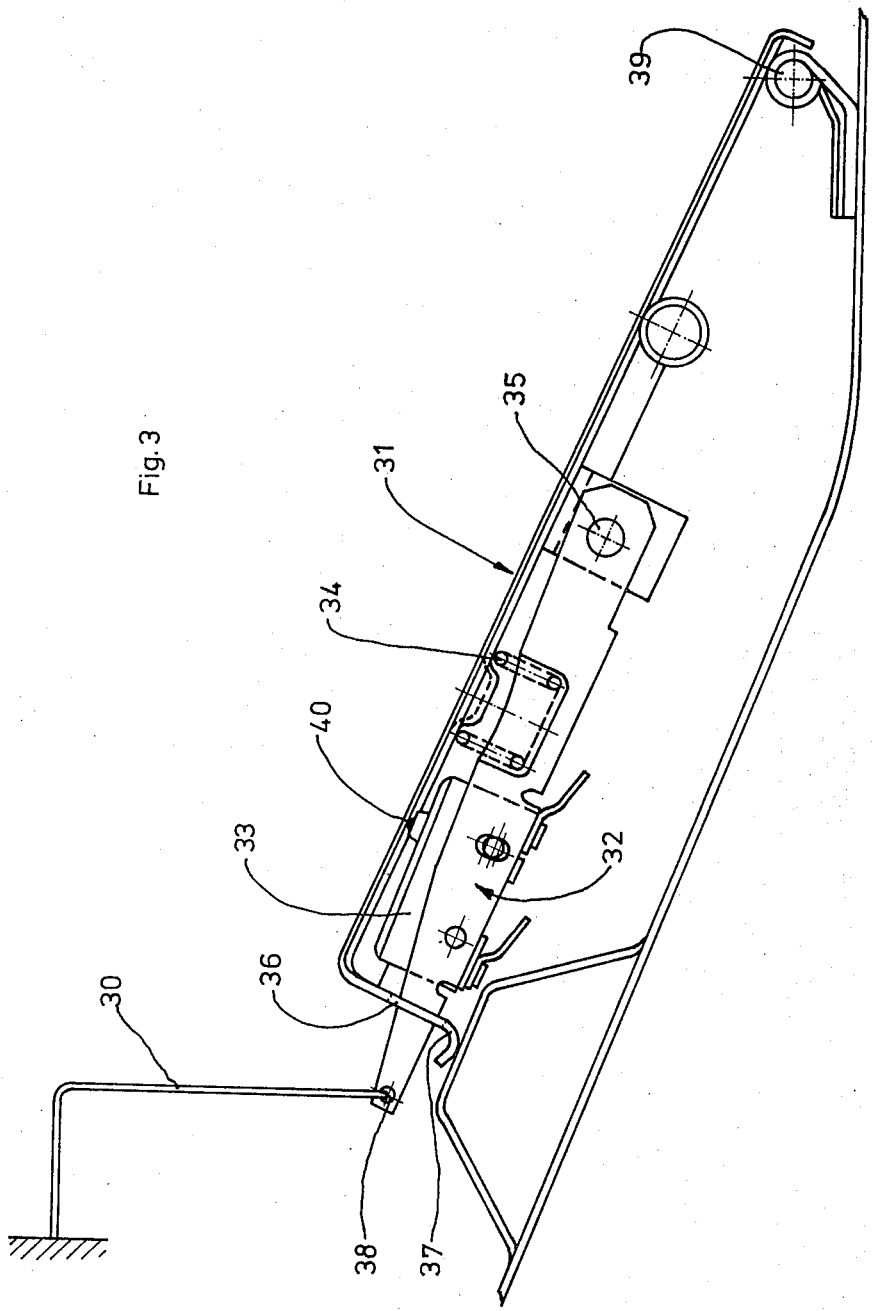
FIG. 3 is a side view of a second embodiment of the invention, showing the gas pedal in a position beyond its full throttle position.

FIG. 3 shows a second embodiment of the invention in which the linkage device, shown only in part and designated by the numeral 30, is positioned beyond the end of a gas pedal 31. The gas pedal 31 is mounted on the floor of the passenger compartment of an automobile by a hinge 39 with an associated spring for biasing the gas pedal 31 in an idling position. A rocker member 32 pivotally mounted on the underside of the gas pedal 31 carries a switch 33 for an automatic or passing gear for the automobile engine. An oblong mounting slot is provided in the side of the rocker 32 for adjusting the relative position of the switch 33 on the rocker 32 and thus the spacing between the actuating pin 40 of the switch 33 and the underside of the gas pedal 31. As in the embodiment of FIGS. 1 and 2, the rocker 32 is biased against two supports by a compression spring 34. One end of the rocker 32 is supported by a bracket mounted axle or bearing 35, while the other end 38 of the rocker 32 is received in an oblong opening 36 formed in an edge portion 37 of the gas pedal 31. The end 38 of the rocker 32 projects through the opening 36 and is coupled to the linkage device 30.

As the gas pedal 31 is depressed, the rocker 32 moves with the gas pedal 31 and causes a downward movement of the linkage device 30 which transmits movement of the gas pedal 31 to the throttle valve of the automobile carburator (not shown). When the gas pedal 31 is depressed beyond its full throttle position, further downward movement of the linkage device 30 is prevented by a stop (not shown). The linkage device 30 thus effects relative movement of the end 38 of the rocker 32 upwardly toward the underside of the gas pedal 31 against the biasing action of the spring 34. As the rocker 32 pivots about the bearing 35, the switch 33 is moved upwardly until its actuating pin 40 is depressed against the underside of the gas pedal 31, actuating the switch 33 and the passing gear.

It will be understood that the above described embodiment is merely exemplary and that those skilled in the art may make many variations and modifications without departing from the spriit and scope of the invention. All such modifications and variations are intended to be included within the scope of the invention as defined in the appended claims.

I claim:

1. In a gas pedal arrangement for an internal combustion engine including a gas pedal and an associated switch movable with the gas pedal and actuated by the gas pedal when the gas pedal is moved beyond a full throttle position, the improvement comprising linkage means responsive to the gas pedal for transmitting movement of the gas pedal to an engine carburetor, stop means for preventing the linkage means from transmitting to the engine carburetor movement of the gas pedal beyond the full throttle position, a rocker member pivotally and detachably mounted at one end on the gas pedal, at least one spring located between the rocker member and the gas pedal for biasing the rocker member away from the gas pedal, and two supports for the rocker member, against which supports the rocker member is biased by said at least one spring, one support being located adjacent the one end of the rocker member and the other support being located in a zone wherein the linkage means is releasably coupled to the rocker member, said zone being spaced from the one end of the rocker member, the two supports including an opening formed in an edge portion of the gas pedal and an axle associated with the gas pedal and traversing the rocker member, relative movement of the rocker member toward the gas pedal occuring when the gas pedal is moved beyond the full throttle position such that the linkage means effects said relative movement against the biasing of said at least one spring and said relative movement of the rocker member toward the gas pedal actuates the switch.

2. The improvement of claim 1, wherein the one support includes the opening formed in the edge portion of the gas pedal, the opening receiving the one end of the rocker member, and the other support includes the axle associated with the gas pedal and traversing the rocker member, each end of the axle being received in an oblong opening formed in one of a pair of spaced apart flanges connected to the gas pedal.

3. The improvement of claim 1, wherein the one support includes the axle associated with the gas pedal and traversing the rocker member and the other support includes the opening formed in the edge portion of the gas pedal, a portion of the linkage means being coupled to a portion of the rocker member projecting from the opening in the edge portion of the gas pedal.

4. The improvement of claim 1, wherein the switch is mounted on the rocker member.

5. The improvement of claim 2, wherein the linkage means includes an elongated member coupled to the gas pedal and the axle is formed by a portion of said elongated member.

6. The improvement of claim 1, wherein the stop means is associated with a floor arranged beneath the gas pedal.

7. The improvement of claim 1, wherein the linkage means includes an arm coupled at one end to the gas pedal and eccentrically mounted at its other end on a pivoting lever and wherein the stop means limits pivotal movement of the lever.

* * * * *